(12) United States Patent
Galbraith et al.

(10) Patent No.: US 6,937,415 B2
(45) Date of Patent: Aug. 30, 2005

(54) METHOD AND APPARATUS FOR ENHANCED DATA CHANNEL PERFORMANCE USING READ SAMPLE BUFFERING

(75) Inventors: Richard Leo Galbraith, Rochester, MN (US); Weldon Mark Hanson, Rochester, MN (US); Travis Roger Oenning, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 279 days.

(21) Appl. No.: 10/067,019

(22) Filed: Feb. 4, 2002

(65) Prior Publication Data

US 2003/0147168 A1 Aug. 7, 2003

(51) Int. Cl.[7] ................................. G11B 5/09
(52) U.S. Cl. .......................... 360/53; 360/46
(58) Field of Search .................. 360/53, 32, 31, 360/46, 51, 69, 65, 77.08, 78, 14; 714/769, 770

(56) References Cited

U.S. PATENT DOCUMENTS 5,220,569 A * 6/1993 Hartness ................ 714/758
6,130,794 A * 10/2000 Christensen ............. 360/53

* cited by examiner

Primary Examiner—Alan T. Faber
(74) Attorney, Agent, or Firm—Joan Pennington

(57) ABSTRACT

A method and apparatus are provided for implementing enhanced data channel performance using a read sample buffer in a direct access storage device (DASD). Disk data is read and stored in the read sample buffer. When a data recovery procedure (DRP) starts, the stored disk read data in the read sample buffer is detected. Error correction code (ECC) checking of the detected sample buffer disk data is performed to identify correctly recovered data. Using the disk read data stored in the read sample buffer enables data recovery without identification of a sync word. Also using the disk read data stored in the read sample buffer enables data recovery with changed channel data detection settings to recover the data. The read sample buffer can be used for accumulating read disk data from more than one read operation so that at least some channel noise is averaged out.

16 Claims, 8 Drawing Sheets

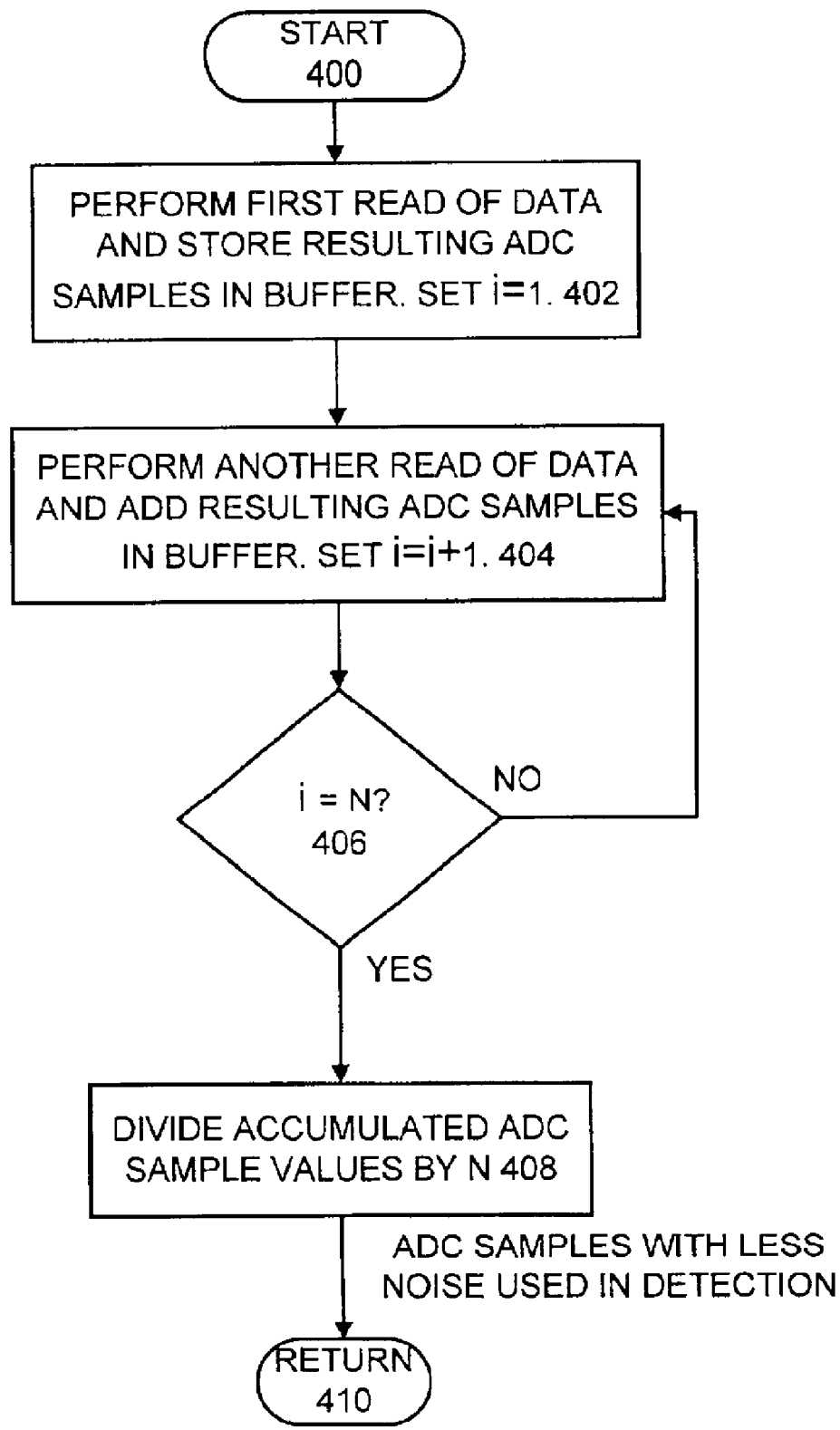

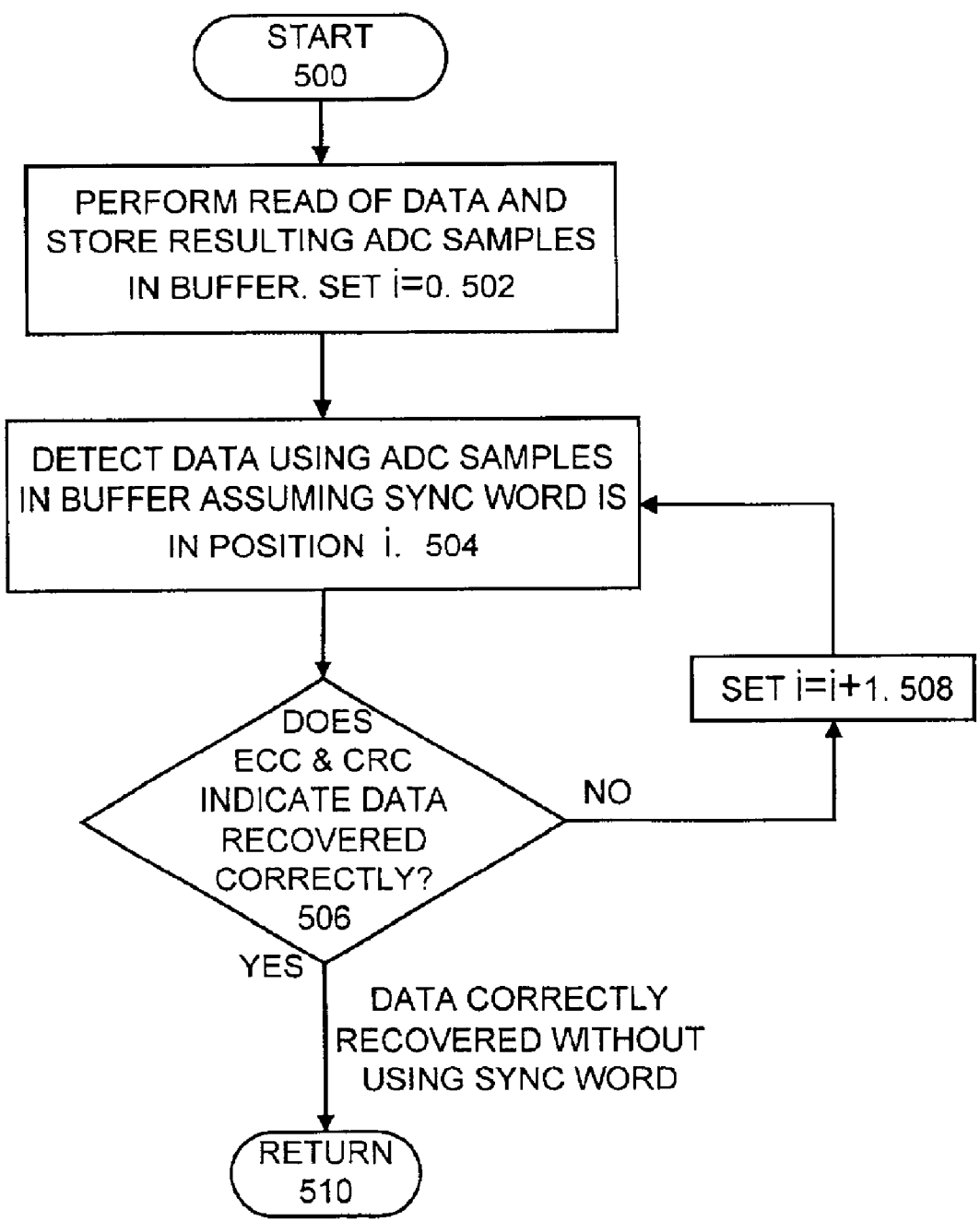

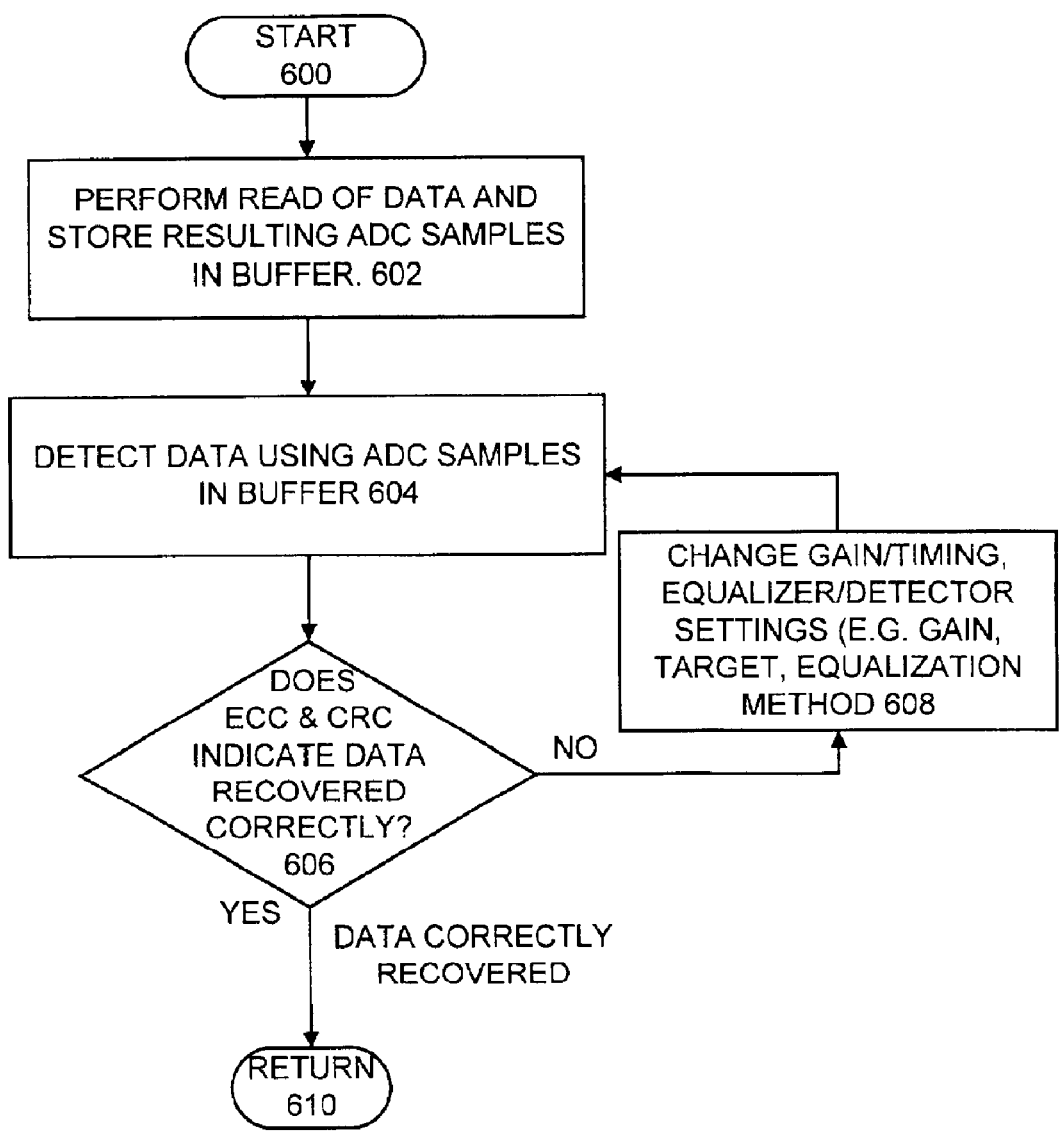

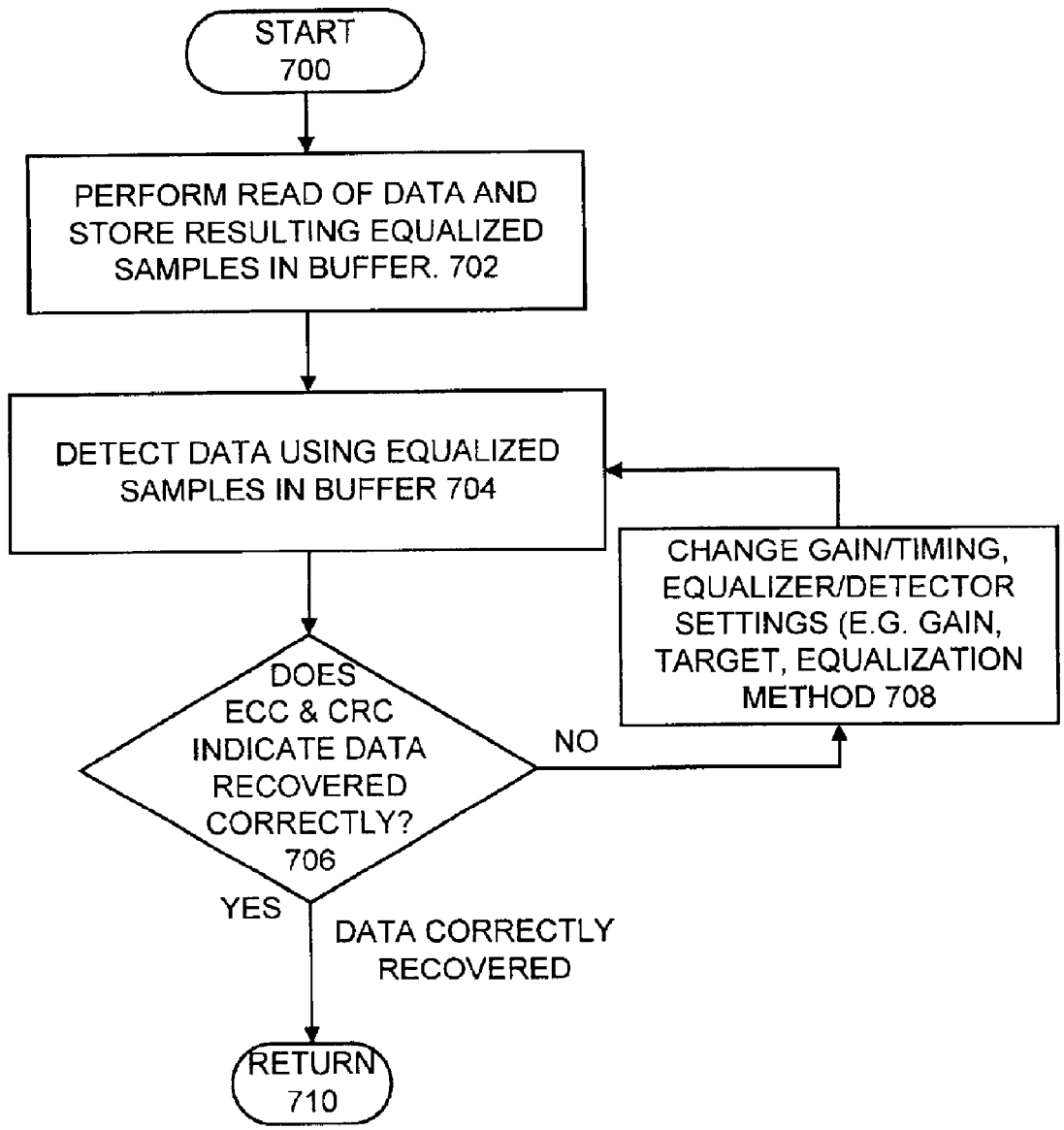

METHOD AND APPARATUS FOR ENHANCED DATA CHANNEL PERFORMANCE USING READ SAMPLE BUFFERING

FIELD OF THE INVENTION

The present invention relates generally to the data processing field, and more particularly, relates to a method and apparatus for implementing enhanced data channel performance using read sample buffering in a direct access storage device (DASD).

DESCRIPTION OF THE RELATED ART

Computers often include auxiliary memory storage units having media on which data can be written and from which data can be read for later use. DASDs or disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Data located on a particular track on a disk surface is read or written by properly positioning a data transducer head directly over the track. In order to maintain the head in proper position over the data track, servo systems typically are incorporated into disk drives.

In magnetic recording the data channel is responsible for reliably determining recorded data given a noisy waveform constructed using a read head and read pre-amplifier. The data channel cannot always perform its task due to the noisy nature of the information received.

Hard error occurrence often results from contact between the head and disk or in combination with debris during the write operation resulting in corruption of the written data making recovery of the written data difficult or impossible. Corruption of the written data pattern typically results in variation to amplitude, frequency, phase, resolution and overwrite properties. Large variations in these properties observed at the time when the data is read from the disk can greatly degrade the detector's ability to reconstruct the customer data from the analog read waveform. Ability to modify detector or signal properties based on the corrupted pattern enhances the detector's ability to reconstruct the customer data to a level correctable by error correction code (ECC). File data recovery procedures are typically limited to approximately 200 re-read operations, each having a time penalty of the latency of one spindle revolution to allow for successive recovery steps.

SUMMARY OF THE INVENTION

A principal object of the present invention is to provide a method and apparatus for implementing enhanced data channel performance using read sample buffering in a direct access storage device (DASD). Other important objects of the present invention are to provide such method and apparatus substantially without negative effect and that overcome many of the disadvantages of prior art arrangements.

In brief, a method and apparatus are provided for implementing enhanced data channel performance using a read sample buffer in a direct access storage device (DASD). Disk data is read and stored in the read sample buffer. When a data recovery procedure (DRP) starts, the stored disk read data in the read sample buffer is detected. Error correction code (ECC) checking of the detected sample buffer disk data is performed to identify correctly recovered data.

In accordance with features of the invention, using the disk read data stored in the read sample buffer enables data recovery without identification of a sync word. Using the disk read data stored in the read sample buffer enables data recovery with changed data detection settings to recover the data. The read sample buffer can be used for accumulating read disk data from more than one read operation so that at least some channel noise is averaged out.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4, 5, 6, and 7 are flow charts illustrating exemplary sequential steps for implementing methods for data recovery in accordance with the preferred embodiment.

DETAILED DESCRIPTION OF THE PREFERRED EMBODIMENTS

Figure 1:
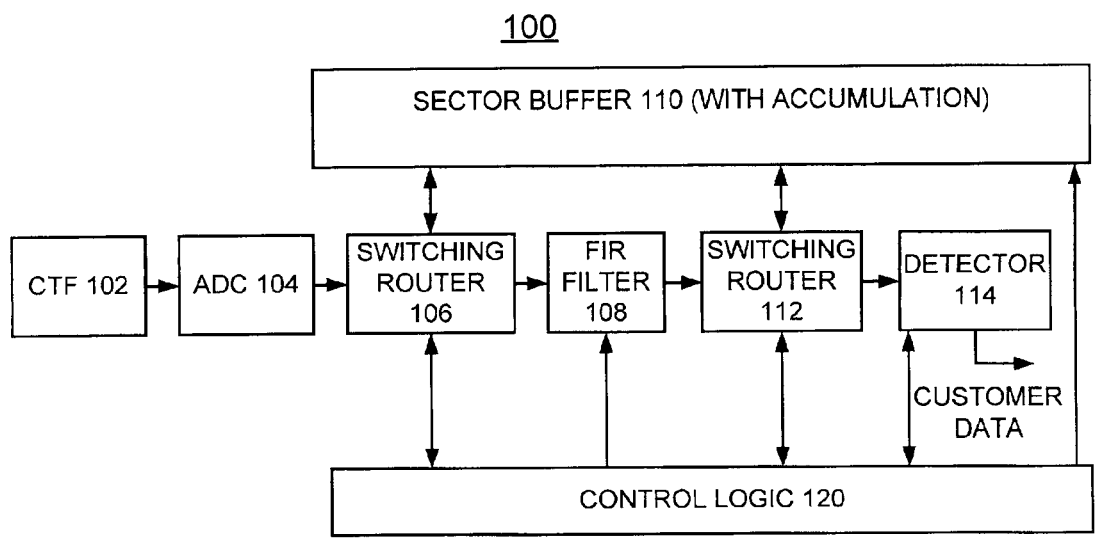
FIG. 1 is a block diagram representation illustrating a read data channel for implementing methods for data recovery in accordance with the preferred embodiment.

Having reference now to the drawings, in FIG. 1, there is shown a read data channel of the preferred embodiment generally designated by the reference character 100. As shown in FIG. 1, data channel 100 includes a continuous time filter (CTF) 102 that receives a disk read signal input and provides a filtered disk read signal input to an analog-to-digital (ADC) 104. The ADC 104 converts the filtered disk read signal to a digital form or ADC disk data samples. The digital read signal is applied to a switching router 106 coupled to the output of ADC 104. Switching router 106 couples the digital read signal to a finite impulse response (FIR) filter 108 and a sector read buffer 110 of the preferred embodiment. The digital read signal is equalized using the finite impulse response (FIR) filter 108. A second switching router 112 is coupled to the output of FIR filter 108 and is coupled to the sector read data buffer 110. Switching router 112 selectively couples the equalized filtered sample values from the FIR filter 108 to the sector read data buffer 110. The FIR filter 108 or the sector read data buffer 110 applies equalized filtered sample values to a detector 114 via the switching router 112. Data channel 100 includes a control logic block 120 coupled to the switching router 106, FIR filter 108, switching router 112, detector 114, and data buffer 110.

In accordance with features of the preferred embodiment, new recovery algorithms are enabled using the digital data stored in the sector data buffer 110 that iterate upon the read data within the period or latency of one spindle revolution allowing for recovery within that latency period or may be used to modify channel settings during a subsequent re-read to make the re-read more effective.

In accordance with features of the preferred embodiment, the sector read data buffer 110 is used to store a block of digitized samples as received. A significant advantage is gained by having data from the sector buffer 110 available to be exploited for data recovery. The stored samples are used to aid in data recovery, for example, when the data channel 100 would have otherwise failed. Sector read data buffer 110 also is used with accumulation. By accumulating the results of more than one read operation some or all of the noise can be averaged out. This operation can greatly enhance the detector and timing loop performance of channel 100.

In accordance with features of the preferred embodiment, the sector buffer 110 advantageously is used in data recovery without requiring rereading from the disk. In the event that the data channel 100 is unable to reliably recover the data, the delay required to perform a disk reread operation may be unacceptable. In this case, since all samples needed are stored in the sector buffer 110, more than one attempt can be made at recovering the data without requiring the added latency delay required to perform a re-read from the disk.

In accordance with features of the preferred embodiment, examples of operation without a re-read from the disk include but are not limited to the following. First, alternate detection strategies can be used with rereading from the data buffer 110, for example, such as usage of different channel detection settings, different detectors, noise predictors/ whitening circuits, equalization or Viterbi path weighting. Second, successively extracting information by algorithms can be used that are helpful in a reread from the data buffer 110. Adaptive equalization can be used with ADC samples stored in the read buffer 110 for improvement of the signal quality within the detector 114; and modifying the sector word frame pointer within an algorithm allowing for recovery of data without the identification of a sync word, but relying upon error correcting code (ECC) and cyclic redundancy check (CRC) to provide feedback for error correction can be used in accordance with the preferred embodiment. By rereading from the data buffer 110, for example, extraction of an erasure pointer for usage in ECC recovery and interpolation of the buffered read data to cancel timing or gain variation in the read back signal advantageously is provided in accordance with the preferred embodiment.

In accordance with features of the preferred embodiment, stored data from the data buffer 110 also is used, for example, for characterization of error information for the purpose of enhancing the effectiveness of a subsequent reread from the disk. This enables the usage of adaptive equalization to enhance recovery during a subsequent reread of the data sector; and extraction of timing information to allow introduction of timing loop changes during a reread to offset phase or frequency related timing errors.

Figure 2A:
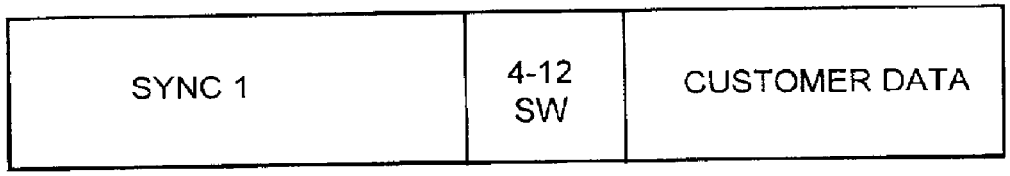
FIGS. 2A, 2B, 2C, 2D are diagrams illustrating prior art word sync timing and track formats.
Figure 2B:
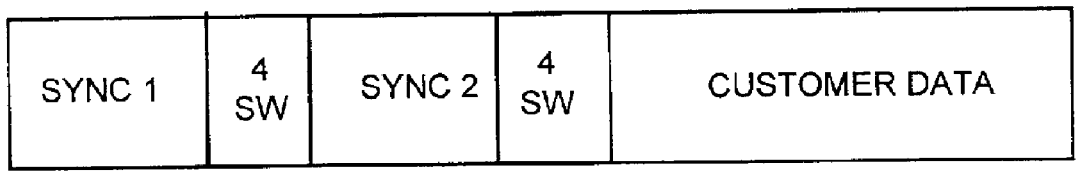
Figure 2C:
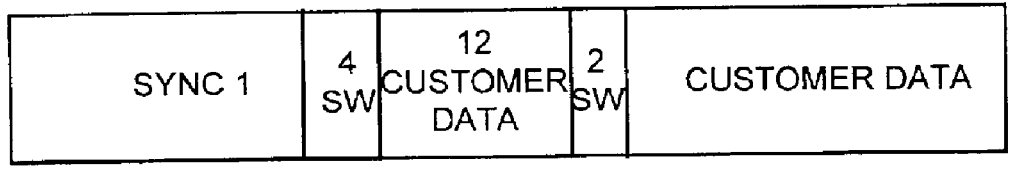
Figure 2D:
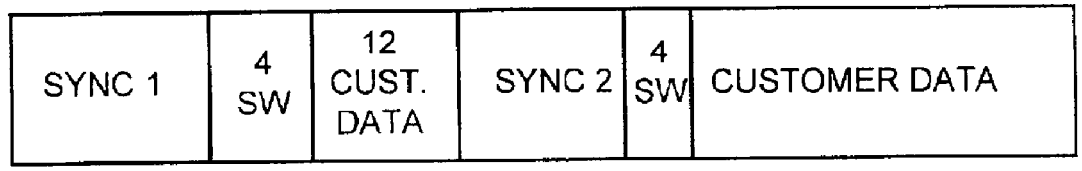

FIGS. 2A, 2B, 2C, 2D illustrate four known word synchronization (sync) timing and track formats. In FIG. 2A, a single sync 1 field and a 4–12 byte sync word (SW) precedes customer data. The sync word (SW) field is used to identify the start of data. FIG. 2B illustrates dual sync 1 and sync 2 fields with dual 4 byte sync words preceding customer data. FIG. 2C illustrates a single sync 1 field with dual 4 byte sync words and split customer data fields. FIG. 2D illustrates dual sync 1 and sync 2 fields with dual 4 byte sync words and split customer data fields.

Figure 3A:
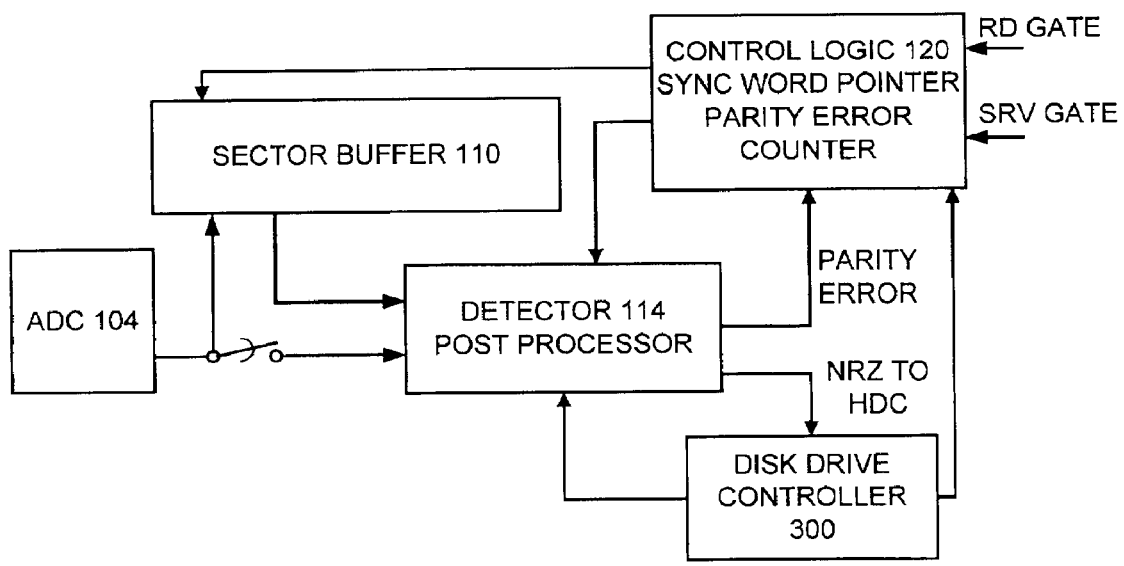
FIG. 3A is a schematic and block diagram illustrating data recovery operation of the read data channel of FIG. 1 in accordance with the preferred embodiment.

FIG. 3A illustrates data recovery operation of the read data channel 100 in accordance with the preferred embodiment. The output of ADC 104 is coupled to the sector buffer 110 of the preferred embodiment. The digital sample values of sector buffer 110 are applied to the detector 114. Data control logic block 120 receives read gate and servo gate inputs and a parity error signal from the detector 114. Data control logic block 120 provides control signals to the sector buffer 110 and the detector 114. Detector 114 provides non-return-to-zero (NRZ) user output data or customer data to a disk drive controller 300 coupled to the detector and control logic block 120.

FIG. 3A illustrates the read data channel 100 configured for enabling data recovery methods with the sync word failure or without identification of the sync word for reading sampled readback signal into the channel sector buffer 110 and using a procedure involving movement of a pointer into the buffer 110 to allow the data to be correctly framed and read with ECC. A first method uses the disk drive controller 300 to determine a correct pointer location using successive rereads of the channel buffer 110 and ECC, for example, during spindle latency in a data recovery procedure (DRP). A second method uses channel parity and probability to locate the correct pointer location and thereafter, data recovery by a reread from the channel buffer 110. The first method requires disk drive controller change where as the second method is less reliable for identification of the correct frame location, especially with less than six parity encoded blocks in a split sector format.

In the first method of the preferred embodiment with the disk drive controller 300 of ECC, sync wordless recovery of data is provided by using the buffer 110 by storing ADC samples, then specifying sync word location by buffer pointer. The disk read operation to fill the buffer 110 by storing ADC samples uses a fake sync word and fake bit sync. The buffer pointer is incremented into the buffer 110 after servo desertion until the correct sync word location is identified by parity errors and/or ECC in the post processor detector 114 or by a special disk drive controller recovery mode.

In the data recovery procedure (DRP) of the preferred embodiment using the disk drive controller 300, the disk drive controller identifies error location as a candidate by timeout of the sync word pattern. A DRP reread step is utilized to store ADC data to the buffer 110. The channel 100 and the disk drive controller 300 are set to the recovery mode and buffer data reads are performed until ECC/CRC indicates successful read. The disk drive controller 300 invokes the recovery read mode allowing a reread, for example, by read gate assertion of the channel buffer data after each servo period, indicated as RD GATE in FIG. 3A. The word frame pointer is incremented after each read operation until read completes with correct ECC. This recovery read mode allows searching of ~200 pointer iterations (24 bytes) per revolution, for example, allowing recovery of data within 1 disk revolution.

Figure 3B:
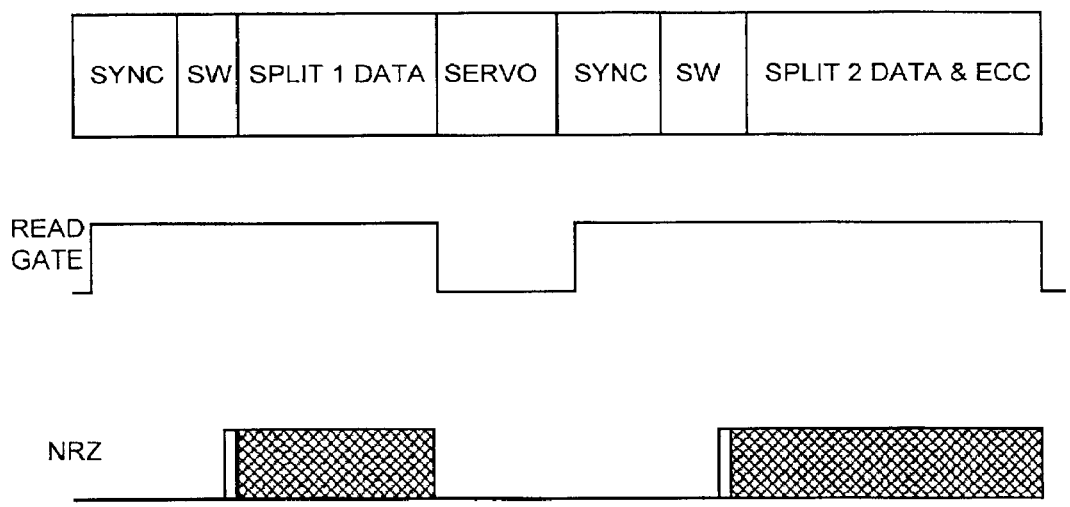
FIG. 3B is a timing diagram illustrating a split sector recovery method of the read data channel of FIG. 3A in accordance with the preferred embodiment.

FIG. 3B is a timing diagram illustrating a split sector recovery method using the read data channel 100 as shown in FIG. 3A in accordance with the preferred embodiment. For split sector arrangement as shown in FIG. 3B, a channel register is set to select the first or second split sector before the reread step. The DRP reread step is performed with either the failing first or second split data using a fake sync word and ADC samples from the first and second split data are directed into the channel buffer 110. Only the pointer for the bad split is incremented for subsequent buffer data reads. The channel buffer read requires two read gate periods as shown in FIG. 3B at line READ GATE based upon bytes stored in each split. ADC data of the good split 1 data or split 2 data is stored with a buffer pointer and output based on the byte framing from the successful sync word read operation. For the preferred implementation, data read to the channel buffer 110 for the failing one of split 1 data or split 2 data should include additional bytes to allow for recovery with variation of early read gate timing. When the first split 1 data is bad, the split 1 data is sent to the channel buffer 110 using a fake sync word. The word frame pointer is incremented after each read operation through the first split data until read completes with correct ECC. The second split 2 data passes data from the split 2 data. When the second split 2 data is bad, the split 1 data is loaded to buffer 110, and split 2 data is loaded to the channel buffer 110 using a fake sync word.

The split 1 data is loaded during the first read gate assertion. The word frame pointer is incremented after each read operation through the second split data until read completes with correct ECC.

The second data recovery method using only channel circuitry of the preferred embodiment requires common buffer operations of storing and retrieving data internal to the channel 100 as described in the first method using the disk drive controller 300 and ECC correction. The second data recovery method using only channel circuitry uses a search algorithm and pointer movement based on running the detector 114 after desertion of servo gate allowing for a search through, for example, less than 100 pointer locations during one revolution to converge to the correct pointer value. Disk drive controller read gate assertion is not required. The pointer location is determined by an algorithm minimizing parity correction/errors across a set number N of parity blocks, each of the parity blocks having M parity bits. Transparency is achieved relative to the disk drive controller buffer operations. Except for requiring register setting in the channel to initiate the search algorithm, no change to the disk drive controller 114 is required. Data recovery occurs as a reread at the error sector with normal read timing, except that the data comes from the channel buffer 110. Read hard error rate is guaranteed by ECC/CRC and uniqueness of the parity information with respect to the customer data. Failure to identify location of the byte frame pointer can occur if an insufficient number of parity bits or partiy frames are used in the sync word location algorithm.

Referring to FIGS. 4, 5, 6, and 7, there are shown exemplary sequential steps for implementing methods for data recovery in accordance with the preferred embodiment.

Referring now to FIG. 4, exemplary sequential steps for implementing a data accumulation method for data recovery in accordance with the preferred embodiment starting at a block 400. A first read of data is performed and the resulting ADC samples are stored in buffer 110 and a read index i is set to 1 as indicated in a block 402. Another read of data is performed and the resulting ADC samples are added in buffer 110 and the read index i is incremented 1 as indicated in a block 404. Checking whether the read index i equals a set number N of re-reads is performed as indicated in a decision block 406. If the read index i does not equal the set number N of re-reads, then another read of data is performed and the resulting ADC samples are added in buffer 110 and the read index i is incremented 1 at block 404. Otherwise, when the read index i equals the set number N of re-reads, then the accumulated ADC sample values stored in the buffer 110 are divided by N as indicated in a block 408. Then the sequential steps return as indicated in a block 410. Then the ADC samples with at least some electronic noise averaged out at block 408 are used in data detection in channel 110.

Referring now to FIG. 5, exemplary sequential steps for implementing a retry with no re-read method for data recovery in accordance with the preferred embodiment starting at a block 500. A first read of data is performed and the resulting ADC samples are stored in buffer 110 and a sync word position index i is set to 0 as indicated in a block 502. The ADC samples in buffer 110 are used for data detection in channel 100 assuming the sync word is in position i as indicated in a block 504. Checking whether the ECC and CRC indicate data is recovered correctly is performed as indicated in a decision block 506. If not, then the sync word position index i is incremented 1 as indicated in a block 508. Then the ADC samples in buffer 110 again are used for data detection in channel 100 assuming the sync word is in the current position i at block 504. Otherwise, when the ECC and CRC indicate data is recovered correctly, then the data has been properly recovered without using a sync word. Then the sequential steps return as indicated in a block 508.

Referring now to FIG. 6, exemplary sequential steps for implementing another retry with no re-read method for data recovery in accordance with the preferred embodiment starting at a block 600. A first read of data is performed and the resulting ADC samples are stored in buffer 110 as indicated in a block 602. The switching router 106 couples the ADC samples from the ADC 104 that are stored in buffer 110 at block 602. The ADC samples in buffer 110 are used for data detection in channel 100 as indicated in a block 604. Checking whether the ECC and CRC indicate data is recovered correctly is performed as indicated in a decision block 606. If not, then one or more of the gain/timing, equalizer/detector settings in channel 100 are changed, that is the gain, target, equalization method of channel 100 is changed, as indicated in a block 608. Then the ADC samples in buffer 110 again are used for data detection in channel 100 at block 604. Otherwise, when the ECC and CRC indicate data is recovered correctly, then the data has been properly recovered that may have otherwise been unrecoverable. Then the sequential steps return as indicated in a block 608.

Referring now to FIG. 7, exemplary sequential steps for implementing another retry with no re-read method for data recovery in accordance with the preferred embodiment starting at a block 700. A first read of data is performed and the resulting equalized samples are stored in buffer 110 as indicated in a block 702. The switching router 112 couples the equalized samples from the FIR filter 108 that are stored in buffer 110 at block 702. The equalized samples in buffer 110 are used for data detection in channel 100 as indicated in a block 704. Checking whether the ECC and CRC indicate data is recovered correctly is performed as indicated in a decision block 706. If not, then one or more of the gain/timing, equalizer/detector settings in channel 100 are changed, that is the gain, target, equalization method of channel 100 is changed, as indicated in a block 708. Then the equalized samples in buffer 110 again are used for data detection in channel 100 at block 704. Otherwise, when the ECC and CRC indicate data is recovered correctly, then the data has been properly recovered that may have otherwise been unrecoverable. Then the sequential steps return as indicated in a block 708.

While the present invention has been described with reference to the details of the embodiments of the invention shown in the drawing, these details are not intended to limit the scope of the invention as claimed in the appended claims.

What is claimed is:

1. A method for implementing enhanced data channel performance using a read sample buffer in a direct access storage device (DASD) comprising the steps of:
   utilizing an analog-to-digital converter (ADC) for receiving a disk read signal and converting said disk read signal to ADC disk data samples;
   storing said ADC disk data samples in said read sample buffer;
   starting a data recovery procedure (DRP) using said stored ADC disk data samples in said read sample buffer; and
   error correction code (ECC) checking of said stored ADC disk data samples from said sample buffer to identify correctly detected data.

2. A method for implementing enhanced data channel performance using a read sample buffer as recited in claim 1 wherein the step of reading and storing disk data in said read sample buffer includes the step of setting a sync word position index to zero.

3. A method for implementing enhanced data channel performance using a read sample buffer as recited in claim 2 further includes the steps responsive to said error correction code (ECC) checking of said sample buffer disk data failing to identify correctly recovered data, of sequentially incrementing said sync word position index and using said stored disk data in said read sample buffer using each said incremented said sync word position index until said error correction code (ECC) checking of said stored disk data from said sample buffer identifies correctly detected data.

4. A method for implementing enhanced data channel performance using a read sample buffer as recited in claim 1 further includes the steps responsive to said error correction code (ECC) checking of said sample buffer disk data failing to identify correctly recovered data, of sequentially changing at least one of channel gain and timing, channel equalizer, and channel detection setting and using said stored disk data in said read sample buffer with each changed at least one of said channel gain and timing, said channel equalizer, and said channel detection setting until said error correction code (ECC) checking of said stored disk data from said sample buffer identifies correctly detected data.

5. A method for implementing enhanced data channel performance using a read sample buffer in a direct access storage device (DASD) comprising the steps of:
   storing disk read data in said read sample buffer;
   starting a data recovery procedure (DRP) using said stored disk data in said read sample buffer;
   error correction code (ECC) checking of said stored disk data from said sample buffer to identify correctly detected data;
   performing a predefined number of rereads of said disk data and adding each said reread disk data and accumulating said reread disk data in said read sample buffer; and
   dividing said accumulated disk data in said read sample buffer by said predefined number of rereads to identify averaged disk data from said read sample buffer.

6. A method for implementing enhanced data channel performance using a read sample buffer as recited in claim 5 wherein the step of starting said data recovery procedure (DRP) using said stored disk data in said read sample buffer includes the steps of error correction code (ECC) checking of said averaged disk data from said read sample buffer to identify correctly detected data.

7. Apparatus for implementing enhanced data channel performance in a direct access storage device (DASD) comprising:
   a disk drive controller;
   an analog-to-digital converter (ADC) receiving a disk read signal and converting said disk read signal to ADC disk data samples;
   a read sample buffer coupled to said ADC receiving and storing said ADC disk data samples;
   a first switching router coupling said ADC to said read sample buffer;
   a detector coupled to said read sample buffer and said ADC; and
   said disk drive controller for starting a data recovery procedure (DRP) and for using said stored ADC disk data samples in said read sample buffer; and for error correction code (ECC) checking of said stored disk data from said sample buffer to identify correctly detected data.

8. Apparatus for implementing enhanced data channel performance as recited in claim 7 includes a finite impulse response (FIR) filter coupled to said first switching router; said FIR filter having an output coupled to said detector.

9. Apparatus for implementing enhanced data channel performance as recited in claim 8 includes a second switching router coupling said read sample buffer to said detector.

10. Apparatus for implementing enhanced data channel performance as recited in claim 9 wherein said second switching router for coupling an equalized filter output of said FIR filter to said detector.

11. Apparatus for implementing enhanced data channel performance as recited in claim 7 wherein said disk drive controller for performing a predefined number of rereads of said disk data and for accumulating said ADC disk data samples for each said reread disk data in said read sample buffer.

12. Apparatus for implementing enhanced data channel performance as recited in claim 7 wherein said disk drive controller responsive to said error correction code (ECC) checking of said detected sample buffer data failing to identify correctly recovered data, for sequentially changing at least one channel detection setting and using said stored read sample buffer data with each said changed channel detection setting until said error correction code (ECC) checking of said sample buffer data identifies correctly detected data.

13. Apparatus for implementing enhanced data channel performance as recited in claim 7 wherein said disk drive controller responsive to said error correction code (ECC) checking of said detected sample buffer data failing to identify correctly recovered data, for sequentially changing at least one channel equalizer setting and using said stored read sample buffer data with each said changed channel equalizer setting until said error correction code (ECC) checking of said sample buffer data identifies correctly detected data.

14. Apparatus for implementing enhanced data channel performance as recited in claim 7 wherein said disk drive controller responsive to said error correction code (ECC) checking of said detected sample buffer data failing to identify correctly recovered data, for sequentially changing at least one channel gain and timing setting and using said stored read sample buffer data with each said changed channel gain and timing setting until said error correction code (ECC) checking of said sample buffer data identifies correctly detected data.

15. Apparatus for implementing enhanced data channel performance as recited in claim 7 wherein said disk drive controller responsive to said error correction code (ECC) checking of said detected sample buffer data failing to identify correctly recovered data, for sequentially incrementing said sync word position index and detecting said stored read sample buffer data using each said incremented said sync word position index until said error correction code (ECC) checking of said sample buffer data identifies correctly recovered data.

16. Apparatus for implementing enhanced data channel performance as recited in claim 7 wherein said disk drive controller for sequentially detecting said stored read sample buffer data during said data recovery procedure (DRP).

* * * * *